United States Patent [19]

Freimanis

[11] 4,042,786
[45] Aug. 16, 1977

[54] TELEPHONE RINGER CIRCUIT

[75] Inventor: Laimons Freimanis, Chicago, Ill.

[73] Assignee: Bell Telephone Laboratories, Incorporated, Murray Hill, N.J.

[21] Appl. No.: 680,363

[22] Filed: Apr. 26, 1976

[51] Int. Cl.² .............................................. H04M 1/26
[52] U.S. Cl. ................................................. 179/84 R
[58] Field of Search .............. 179/84 R, 84 VF, 84 T, 179/2 A

[56] References Cited

U.S. PATENT DOCUMENTS

| | | | |
|---|---|---|---|
| 3,471,651 | 10/1969 | Saia | 179/84 R |
| 3,603,740 | 9/1971 | Cambridge | 179/84 T |
| 3,688,038 | 8/1972 | Hugyecz | 179/84 R |
| 3,808,379 | 4/1974 | Lind | 179/84 T |
| 3,904,833 | 9/1975 | Beene | 179/84 R |

Primary Examiner—Kathleen H. Claffy
Assistant Examiner—Joseph A. Popek
Attorney, Agent, or Firm—John C. Albrecht; Peter Visserman

[57] ABSTRACT

A telephone ringing circuit responds to both conventional high voltage 20Hz ringing signals and low voltage tone alerting signals. A conventional electromechanical ringer is connected across the telephone line and is responsive to high voltage 20Hz ringing signals. A high capacitance capacitor is charged by the dc voltage present on the telephone line and is discharged across the electromechanical ringer when a tone detector circuit connected across the line detects a tone alerting signal, thereby activating the electromechanical ringer.

4 Claims, 1 Drawing Figure

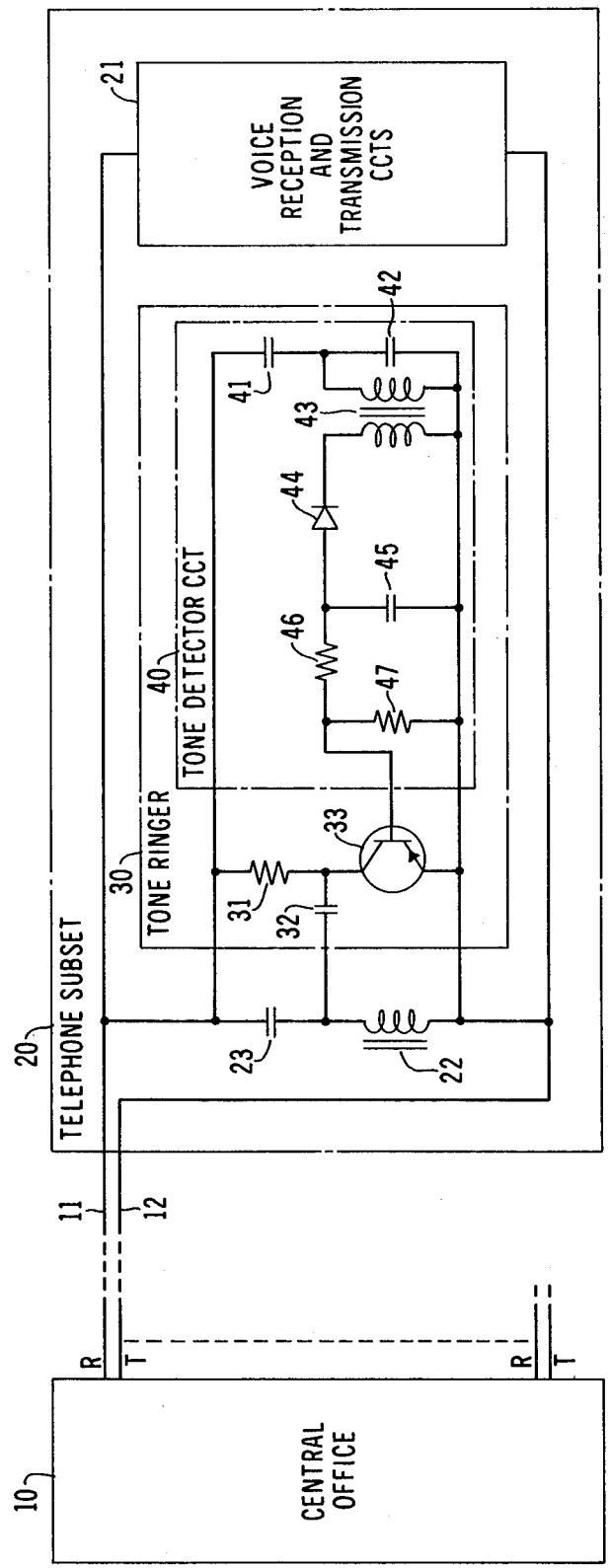

TELEPHONE RINGER CIRCUIT

BACKGROUND OF THE INVENTION

This invention relates to telephone systems and particularly to subscriber set ringing circuits.

A conventional telephone subset includes a bell or ringer which is used for alerting the subscriber and is operated by applying a high voltage low frequency ringing signal on the subscriber line. Prior telephone switching networks have provided a metallic path for each connection whereby a high voltage ringing signal could be transmitted. Some types of networks, however, cannot conduct such a high voltage signal without damaging the network; for example, a semiconductor network can conduct audio signals but not high voltage ringing signals. It is desirable is such a case to use an audio tone alerting signal which is in the same frequency and voltage range as the voice signals transmitted through the network. As a result, a number of different tone ringers operating on a variety of different principles have been implemented.

A problem exists at the time when a new office using tone alerting signals is cut over to replace an old office using conventional high voltage ringing signals. The problem occurs because tone ringer circuits and conventional ringer circuits are not compatible and therefore it is necessary to change all of the subscriber subsets at the same time the office is cut over. Since changing all of the subscriber subsets at one time is impractical a number of other solutions have been conceived although none of them has proven totally satisfactory. Examples of alternate solutions are the installation of new subscriber lines and subsets responsive to tone alerting while leaving the old subscriber subsets so that each subscriber had two telephone subsets and two lines for a period of time or the use of circuits in the telephone office for generating conventional ringing signals responsive to tone alerting signals so that the old subscriber subsets may be utilized with tone alerting.

It is an object of this invention to provide a subscriber subset that will respond to both conventional ringing signals and to tone alerting signals. Such a subscriber subset may be installed in place of the old subscriber subsets prior to cutover of a new office using tone alerting signals and then the new office may be cut over at any time without concern for the type of ringing signal used. In addition, such a subscriber subset built according to the invention disclosed retains the economical electromechanical ringer along with certain desirable testing features even after cutover to a tone alerting system.

SUMMARY OF THE INVENTION

In accordance with the present invention a telephone ringer ciruzit responds to both conventional high voltage ringing signals and low voltage tone alerting signals. An electromechanical ringer is connected across the telephone line to respond to conventional ringing signals. An energy storage device is connected to store energy present on the telephone line and a tone detector for detecting tone alerting signals is connected across the telephone line. When a tone is detected the energy storage device is connected across the electromechanical ringer thereby activating it.

BRIEF DESCRIPTION OF THE DRAWING

The organization and operation of a telephone ringer circuit according to this invention will be better understood from a consideration of the detailed description of the organization and operation of one illustrative embodiment thereof which follows when taken in conjunction with the accompanying drawing the single FIGURE of which depicts an exemplary telephone ringer circuit in a telephone subset which is connected to a telephone line and thereby the central office.

DETAILED DESCRIPTION

One illustrative ringer circuit according to the invention is shown in the drawing. A central office 10 performs the function of interconnecting a number of telephone subsets as well as providing supervisory and alerting functions such as ringing a telephone subset to gain the attention of the subscriber. A two-wire line comprising ring wire 11 and tip wire 12 is shown connected to a telephone subset 20 constructed according to the invention described herein. Voice reception and transmission circuits 21 are shown in block diagram form and are well known in the prior art. A conventional ringer circuit comprising an elecromechanical ringer 22 and a capacitor 23 is connected across wires 11 and 12. The electromechanical ringer 22 may, for example, comprise a bell, an armature for striking the bell and creating an audible signal and a coil for moving the armature responsive to a current passed through the coil. The capacitor 23 is connected in series with the coil of the electromechanical ringer 22 in order to form a series tuned circuit which is responsive to a high voltage low frequency ringing signal, for example, 86 volts at 20Hz. A tone ringer curcuit 30 is connected to the conventional ringer circuit in order to activate the electromechanical ringer 22 responsive to a low voltage tone alerting signal. A current limiting resistor 31 and an energy storage capacitor 32 are connected in series with capacitor 23 such that one end of capacitor 32 is connected to the common connection of capacitor 23 and electromechanical ringer 22. In one embodiment of the invention the current limiting resistor 31 has a value of 10,000 ohms, the energy storage capacitor 32 has a value of 25μF which assures the storage of sufficient energy to activate the electromechanical ringer when the capacitor 32 is discharged therethrough, capacitor 23 has a value of 0.45μF and the coil of ringer 22 has an inductance of 200 henries. A transistor 33 comprises an emitter terminal connected to tip wire 12, a collector terminal connected to the common connection between resistor 31 and capacitor 32, and a base terminal.

A tone detector circuit 40 comprises a first input connected to ring wire 11, a secon input connected to tip wire 12, and an output connected to the base of transistor 33. A first terminal of an ac coupling capacitor 41 is connected to the first input of tone detector 40. A capacitor 42 is connected in parallel with the primary winding of a two-winding transformer 43 to form a parallel tuned circuit which is tuned to the frequency of the tone alerting signal which it is desired to detect. One common connection of capacitor 42 and the primary of transormer 43 is connected to a second terminal of capacitor 41 and the other common connection of capacitor 42 and the primary of transformer 43 is connected to tip wire 12. The tuned circuits 42, 43 by signal rejection filters out signals at all frequencies except the tone alerting signal frequency. One wire of the secondary of transformer 43 is also connected to tip wire 12 and the other wire of the secondary of transformer 43 is connected to the cathode of a diode 44. The anode of diode 44 is connected to a first terminal of a capacitor 45 and the second terminal of capacitor 45 is connected to tip wire 12. Tone alerting signals present on the secondary of transformer 43 are rectified by diode 44 and filtered by capacitor 45 to provide a dc signal corresponding to the tone alerting signal. The series combination of a resistor 46 and a resistor 47 is connected in parallel with capacitor 45 to form a voltage dividing network. The common connection of resistors 46 and 47 is also connected to the base of transistor 33 so that an appropriate base to emitter voltage is generated to turn on transistor 33 when a tone alerting signal is present. The voltage dividing network comprising resistors 46 and 47 prevents the base emitter junction of transistor 33 from clamping the voltage across capacitor 45 to a low voltage which would interfere with its filtering operation.

With the circuit of this invention connected as described three operative states of the curcuit may now be considered.

In a first operative state having a conventional 86 volt 20Hz ringing signal present on the two wires 11 and 12 the tuned circuit comprising capacitor 23 and electromechanical ringer 22 responds to the ringing signal by causing the electromechanical ringer 22 to generate an audible signal. The presence of resistor 31 and the fact that capacitor 32 is charged tend to isolate the series combination of capacitor 32 and resistor 31 from the ringer circuit comprising capacior 23 and electromechanical ringer 22 when a high voltage ringing signal is present. The tone ringer 30 does not substantially affect the operation of the ringer circuit comprising elements 22 and 23 and therefore ringing takes place in the manner which is well known in the prior art.

In a second state, having no ringing or tone alerting signal present on the wires 11 and 12 the energy storage capacitor 32 is charged by the dc voltage present on the subscriber line. Capacitor 23, having a substantially lower capacitance than capacitor 32, charges quickly and then appears to be an open circuit while capacitor 32 is charging. Transistor 33 having a very high impedance between the collector and emitter terminals due to the absence of a tone alerting signal also appears to be an open circuit in this state. In this state the circuit connected between wires 11 and 12 by the telephone subset 20 substantially comprises voice reception and transmission circuits 21 in parallel with the series combination of current limiting resistor 31, energy storage capacitor 32, and the coil of electromechanical ringer 22. In this circuit energy storage capacitor 32 will initially appear to be a short circuit and then gradually become charged until it has a voltage present on it equal and opposite to that connected to it. Current limiting resistor 31 is necessary to reduce the inital surge of current when energy storage capacitor 32 is first connected to a dc voltage on wires 11 and 12.

In a third state a tone alerting signal is present on wires 11 and 12 and is thereby present at the inputs to tone detector circuit 40. The tone alerting signal is detected by tone detector circuit 40 which generates a signal at its output which is connected to the base of transistor 33. The signal present on the base of transistor 33 causes it to turn on and provide a low impedance between the base terminal and the emitter terminal thereby connecting energy storage capacitor 32 in parallel with the coil of electromechanical ringer 22. The charge stored by energy storage capacitor 32 is discharged across electromechanical ringer 22 causing it to be activated once. For example, in the electromechanical ringer described above, the charge from capacitor 32 would cause the armature to strike the bell once. If a series of short bursts of tone are sent with intertone spacing such that energy storage capacitor 32 is allowed to recharge between each tone burst then the electromechanical ringer 22 may be activated repeatedly in substantially the same manner as it would be by a 20Hz ringing signal.

What has been described is considered to be only one specific illustrative embodiment of the invention and it is to be understood that various other arrangements may be devised by one skilled in the art without departing from the spirit and scope thereof as defined by the accompanying claims.

What is claimed is:

1. A telephone set ringing circuit responsive to conventional high voltage low frequency ringing signals and low voltage high frequency tone alerting signals on a two-wire telephone line comprising:
    an electromechanical ringer connected across said two-wire telephone line responsive to conventional high voltage low frequency ringing signals;
    energy storage menas connected to said telephone line for storing electrical energy present on said two-wire telephone line; and
    tone detector means connected across said two-wire telephone line for connecting said energy storage means to said electromechanical ringer responsive to low voltage high frequency tone alerting signals.

2. A telephone subscriber set alerting circuit responsive to conventional high voltage ac ringing signals and low voltage voice band tone signals on a two-wire telephone line comprising:
    a serially connected first capacitor and electromechanical ringer bridged across said telephone line;
    a serially connected resistor and second capacitor connected in parallel with said first capacitor;
    a tone detector connected to said two-wire telephone line for generating a signal when a certain tone is present thereon; and
    switch means controlled by said signal for connecting said second capacitor across said electromechanical ringer when a tone is present on said telephone line.

3. A telephone set for connecting to a telephone line comprising:
    a voice reception and transmission circuit; and
    an electromechanical ringer for generating an audible signal responsive to a high voltage low frequency ringing signal on said telephone line;
    wherein the improvement comprises:
        energy storage means connected to said telephone line for storing energy received from a dc voltage present on said telephone line; and
        tone detector means for connecting said energy storage means to said electromechanical ringer responsive to low voltage high frequency tone alerting signals.

4. A telephone set ringing circuit alternatively responsive to conventional high voltage low frequency ringing signals and low voltage high frequency tone alerting signals on a two-wire telephone line for providing audible ringing signals at the telephone set comprising:
    an electromechanical ringer series connected with a first capacitor across the telephone line;

a current limiting resistor and a transistor switch series connected across the telephone line;

a seond capacitor connected between the common connection of said first capacitor and said electromechanical ringer and the common connection between said current limiting resistor and said transistor switch, said second capacitor having sufficient capacitance to store enough energy to activate said electromechanical ringer when discharged through the coil thereof; and a tone detector circuit connected across the line and having an output connected to control said transistor switch, said tone detector circuit including tone filter means whereby said transistor switch is enabled only in response to a predetermined tone frequency on the line to cause discharge of said second capacitor through said electromechanical ringer.

* * * * *